F. K. HENDRICKSON.
GEARING.
APPLICATION FILED DEC. 27, 1909.
1,006,551.
Patented Oct. 24, 1911.
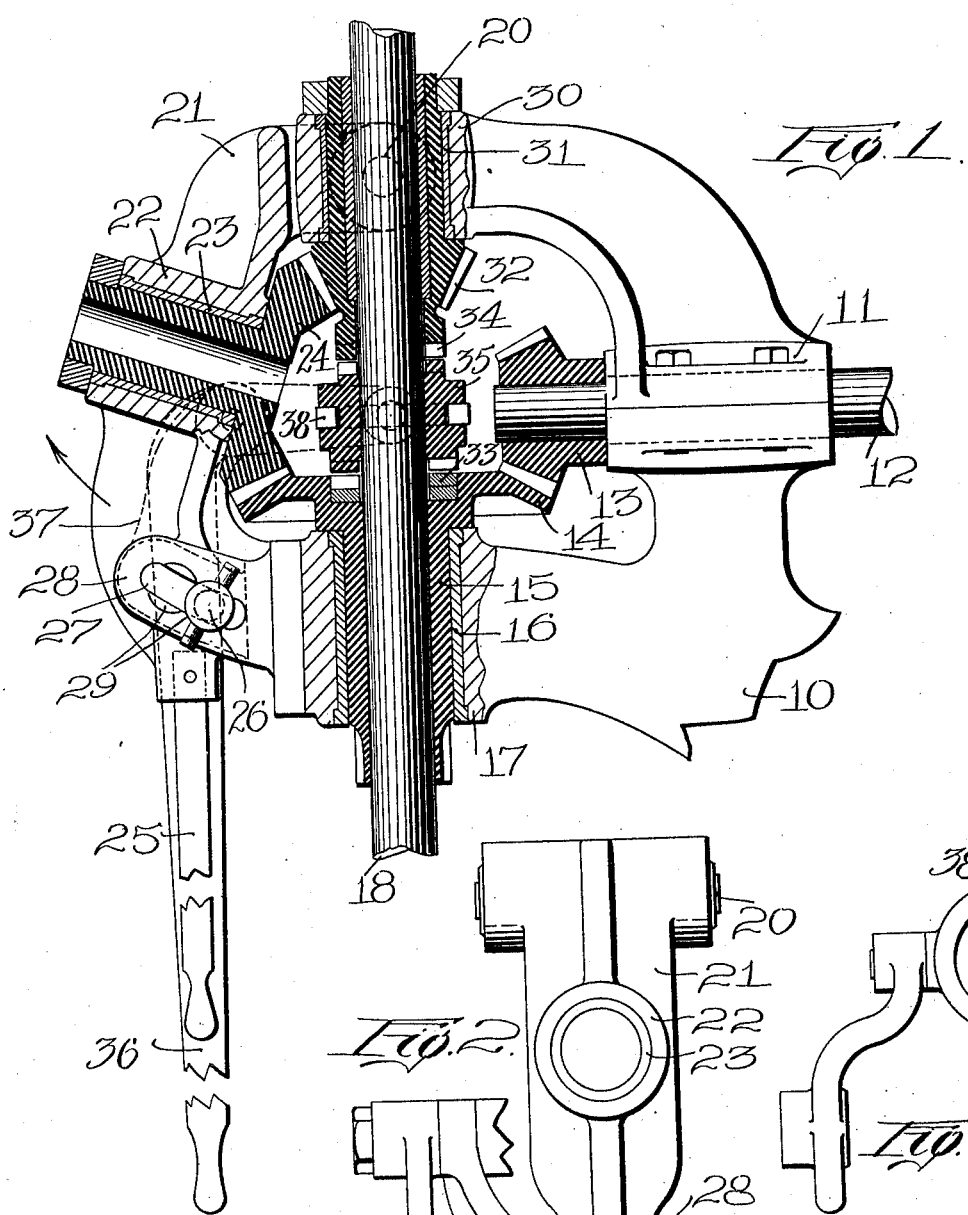

UNITED STATES PATENT OFFICE.

FRED K. HENDRICKSON, OF WORCESTER, MASSACHUSETTS, ASSIGNOR TO PRENTICE BROS. COMPANY, A CORPORATION OF MASSACHUSETTS.

GEARING.

1,006,551.  Specification of Letters Patent.  Patented Oct. 24, 1911.

Application filed December 27, 1909. Serial No. 535,170.

*To all whom it may concern:*

Be it known that I, FRED K. HENDRICKSON, a citizen of the United States, residing at Worcester, in the county of Worcester and State of Massachusetts, have invented a new and useful Gearing, of which the following is a specification.

The principal objects of the invention are to provide a simplified and compact form of gearing for the purpose of retracting the spindle at a greater speed than that with which it is fed forward and to provide mechanism for accomplishing this of such construction that it is very easily manipulated and involves a minimum number of gears, taking up very little space on the machine.

Further objects and advantages of the invention will appear hereinafter.

Reference is to be had to the accompanying drawings, in which—

Figure 1 is a side elevation of a portion of an upright drill partially in central vertical section with a preferred form of tapping attachment applied thereto. Fig. 2 is an end elevation of a portion thereof, and Fig. 3 is a plan of a detail of the clutch lever.

The invention is shown as applied to an upright drill having a frame 10 most of which is constructed in a well known manner. On this frame is bolted a member 11 which with the frame constitutes the bearing for the driving shaft 12. On the driving shaft is a beveled pinion or gear 13 which constantly meshes with a larger beveled gear 14 which is provided with a hub 15 projecting through a bushing 16 in a vertical bearing 17 on the frame. Through the center of this gear 14 and its hub passes the tapping spindle 18 on which the gear 14 is free to rotate.

Pivotally mounted on a shaft or stud 20 at the upper part of the frame is a swinging frame 21 which is provided with a bearing 22 having a bushing 23 therein and in which rotates the hub of a beveled gear 24 which is adapted to mesh with the gear 14 when the frame is swung to proper position. This frame is manipulated by means of an arm 25 projecting downwardly therefrom. This arm is provided with a bolt 26 passing through a slot 27 in an arm 28 bolted to the frame 10. The slot is provided with two recesses 29 for receiving the round head of the bolt. These recesses are the same shape as the head so that the arm and frame 21 can be fixed in two positions in one of which the gear 24 meshes with the gear 14 and in the other of which it is clear of it. On the upper part of the member 11 also is a bearing 30 provided with a bushing 31 for receiving the hub of a small beveled gear or pinion 32 which is loose on the spindle 18 and meshes with the gear 24.

The gears 14 and 32 have upper and lower clutch teeth 33 and 34, respectively, and slidably mounted on the spindle is a clutch member 35 having clutch teeth adapted to engage either of the above mentioned sets of clutch teeth. A lever 36 connected with a yoke 38 is employed for operating the clutch. This is pivoted on a projection 37 on the frame 10.

The operation is as follows:—Power can always be transmitted from the gear 13 to the loose gear 14 in all positions of the parts. When the parts are in the position shown in Fig. 1, the clutch can be moved from the neutral position shown to that in which it engages the teeth 33. Then power is transmitted directly to the spindle. In this way the spindle is rotated forward at a relatively low rate of speed for tapping. To reverse the spindle, it is only necessary to reverse the lever 36 so as to engage the clutch with the teeth 34 and then as the gear 14 is loose on the spindle, power is transmitted through the gear 24 to the gear 32 and then through the clutch to the spindle to reverse the rotation thereof at a high speed. If it is desired to throw the attachment out of operation and operate the spindle in the usual way for drilling, the bolt 26 is loosened, the arm 25 moved to the left until the bolt head comes into the front socket and the bolt is tightened up again to hold the gear 24 in inoperative position. In that case the clutch is left down and the spindle raised by hand in the usual way to withdraw the drill, or otherwise manipulated in accordance with ordinary conditions. By this construction the large number of spur gears ordinarily used for withdrawing the tapping spindle at a high speed are avoided and at the same time a most simple and compact mechanism is employed for securing these results, in which the intermediate transmitting gear is independent of the driving shaft and is not rotated thereby when the tapping attachment is not in use.

While I have illustrated and described a preferred form of the invention, I am aware that many modifications can be made therein by any person skilled in the art without departing from the scope of the invention as expressed in the claims. Therefore, I do not wish to be limited to all the details of construction shown and described but What I do claim is:—

1. The combination with a driving shaft and a spindle at right-angles thereto, of a beveled gear on the driving shaft, two beveled gears on the tapping spindle rotatable independently thereof and of different sizes, the large one meshing with the gear on the driving shaft, a gear for transmitting power from one of said two gears on the tapping spindle to the other, and means whereby either one of the gears on the spindle can be connected therewith for driving it.

2. The combination of a driving shaft, a beveled gear thereon, a spindle, a beveled gear rotatably mounted on the spindle and meshing with the first named gear, a beveled gear meshing with the beveled gear on the spindle and movable out of mesh therewith, another beveled gear on the spindle meshing with the last named beveled gear and rotatable independently of the spindle, and means for connecting either of said beveled gears on the spindle with the spindle.

3. The combination with a driving shaft and a tapping spindle at right-angles thereto, of a beveled gear on the driving shaft, two beveled gears on the tapping spindle rotatable independently thereof and of different sizes, the large one meshing with the gear on the driving shaft, a gear for transmitting power between the two gears on the spindle, means whereby either one of the gears on the spindle can be positively connected therewith for driving it, a frame movably mounted on the frame of the drill on which said transmitting gear is mounted, and means for fixing said frame in two positions on the drill frame in one of which the gear carried by it meshes with both the gears on the spindle and in the other of which it is out of mesh with the larger one.

4. The combination of a frame, a spindle, two gears loosely mounted thereon each having clutch teeth, a frame pivotally mounted on the frame, a gear on said frame adapted to mesh with both of said gears, a handle rigid on said pivoted frame for moving it so as to bring the gear thereon into and out of mesh with one of said gears on the spindle, means on the frame for locking the pivoted frame in each of said positions, a clutch member adapted to connect the spindle with either one of the gears, and a lever for operating said clutch member located adjacent to, and parallel with, said arm.

5. The combination of a frame, a spindle, two bevel gears of different sizes rotatable independently of each other and of the spindle, a frame pivotally mounted on the frame at a point just beyond the smaller of said gears and on the axis of said spindle, a bevel gear on said frame adapted to mesh with both of said gears, an integral handle on said pivoted frame for moving it so as to bring the gear thereon into and out of mesh with the larger of said gears, and means for connecting the spindle with each one of the bevel gears thereon.

In testimony whereof I have hereunto set my hand, in the presence of two subscribing witnesses.

FRED K. HENDRICKSON.

Witnesses:
ALBERT E. KAY,
C. FORREST WESSON.

Copies of this patent may be obtained for five cents each, by addressing the "Commissioner of Patents, Washington, D. C."